(12) United States Patent
Litwin et al.

(10) Patent No.: US 7,685,820 B2
(45) Date of Patent: Mar. 30, 2010

(54) SUPERCRITICAL CO$_2$ TURBINE FOR USE IN SOLAR POWER PLANTS

(75) Inventors: Robert Z. Litwin, Canoga Park, CA (US); Andrew J. Zillmer, Woodland Hills, CA (US); Nathan J. Hoffman, Canoga Park, CA (US); Alan V. von Arx, Northridge, CA (US); David Wait, Westlake Village, CA (US)

(73) Assignee: United Technologies Corporation, Hartford, CT (US)

( * ) Notice: Subject to any disclaimer, the term of this patent is extended or adjusted under 35 U.S.C. 154(b) by 435 days.

(21) Appl. No.: 11/636,247

(22) Filed: Dec. 8, 2006

(65) Prior Publication Data
US 2010/0024421 A1  Feb. 4, 2010

(51) Int. Cl.
*F03G 6/00* (2006.01)

(52) U.S. Cl. .................. 60/641.11; 60/641.15

(58) Field of Classification Search ............... 60/641.8, 60/641.9, 641.11, 641.15
See application file for complete search history.

(56) References Cited

U.S. PATENT DOCUMENTS

| | | | | |
|---|---|---|---|---|
| 3,971,211 | A * | 7/1976 | Wethe et al. | 60/39.181 |
| 4,498,289 | A * | 2/1985 | Osgerby | 60/39.52 |
| 6,668,554 | B1 * | 12/2003 | Brown | 60/641.2 |
| 7,055,519 | B2 * | 6/2006 | Litwin | 126/683 |
| 2004/0099261 | A1 * | 5/2004 | Litwin | 126/638 |
| 2004/0244376 | A1 * | 12/2004 | Litwin et al. | 60/641.8 |
| 2005/0126170 | A1 * | 6/2005 | Litwin | 60/641.8 |
| 2008/0000231 | A1 * | 1/2008 | Litwin et al. | 60/641.11 |

* cited by examiner

*Primary Examiner*—Hoang M Nguyen
(74) *Attorney, Agent, or Firm*—Kinney & Lange, P.A.

(57) ABSTRACT

A solar-powered supercritical carbon dioxide turbine system includes a supercritical carbon dioxide turbine system and a solar heating system. The solar heating system has a molten salt heat transfer fluid for providing thermal energy to the supercritical carbon dioxide turbine system.

20 Claims, 2 Drawing Sheets

SUPERCRITICAL CO₂ TURBINE FOR USE IN SOLAR POWER PLANTS

BACKGROUND OF THE INVENTION

The present invention relates generally to carbon dioxide turbines. In particular, the invention relates to carbon dioxide turbines powered by a renewable energy source.

There is a continuing demand for clean renewable energy sources due to the depletion of the Earth's supply of fossil fuels and concerns over the contribution to global warming from combustion of fossil fuels. Solar power towers generate electric power from sunlight by focusing concentrated solar radiation on a tower-mounted receiver. Solar power tower systems typically include a "cold" storage tank, a solar receiver, heliostats, a "hot" storage tank, and an energy conversion system, such as a steam generator and turbine/generator set. In operation, a heat transfer fluid is pumped from the cold storage tank to the solar receiver. The heat transfer fluid can be any appropriate medium that has the capability to transfer heat and thermally maintain the heat in the medium, such as water, liquid metal, or molten salt.

The solar receiver is typically positioned 50 feet to 250 feet or more above ground and is heated by the heliostats. The heliostats redirect and concentrate solar radiation from the sun onto the solar receiver. The heat transfer fluid flows through receiver tubes of the solar receiver where it is heated by the concentrated solar energy. In the solar receiver, liquid metals have been used as the heat transfer fluid and can reach temperatures of approximately 1600 degrees Fahrenheit (° F.). Water/steam being used as the heat transfer fluid can reach peak temperatures of approximately 1050° F. Molten salts currently being used as the heat transfer fluid can reach temperatures of approximately 1100° F.

After the heat transfer fluid has been heated in the solar receiver, the heat transfer fluid typically flows into the hot thermal storage tank. The heat transfer fluid is then stored in the hot thermal storage tank until it is needed for electrical power generation. The hot thermal storage tank allows for electrical power production during cloudiness or darkness. When electrical energy is needed, the hot heat transfer fluid is pumped from the hot storage tank to an energy conversion system. The heat transfer fluid transfers the heat within the energy conversion system. The energy conversion system can be, for example, a Rankine cycle conversion system or a Brayton cycle conversion system. Brayton cycles, with the use of a regenerator (also called a recuperator) typically have higher efficiencies than Rankine cycles, which have efficiencies of approximately 34% to 40%. After the heat has been removed from the heat transfer fluid, the heat transfer fluid is transported back to the cold storage tank for reuse.

Due to the concern of depleting natural resources and the effect of pollution on global warming, there is a need in the art for a method of producing electricity using renewable resources. In addition, solar power facilities typically have high capital costs, thus, there is also a need in the art for a method of producing electricity in an efficient and cost-effective manner.

BRIEF SUMMARY OF THE INVENTION

A turbine system includes a supercritical carbon dioxide turbine and a solar heating system. The solar heating system has a molten salt heat transfer fluid for providing thermal energy to the supercritical carbon dioxide turbine.

DETAILED DESCRIPTION

Figure 1:
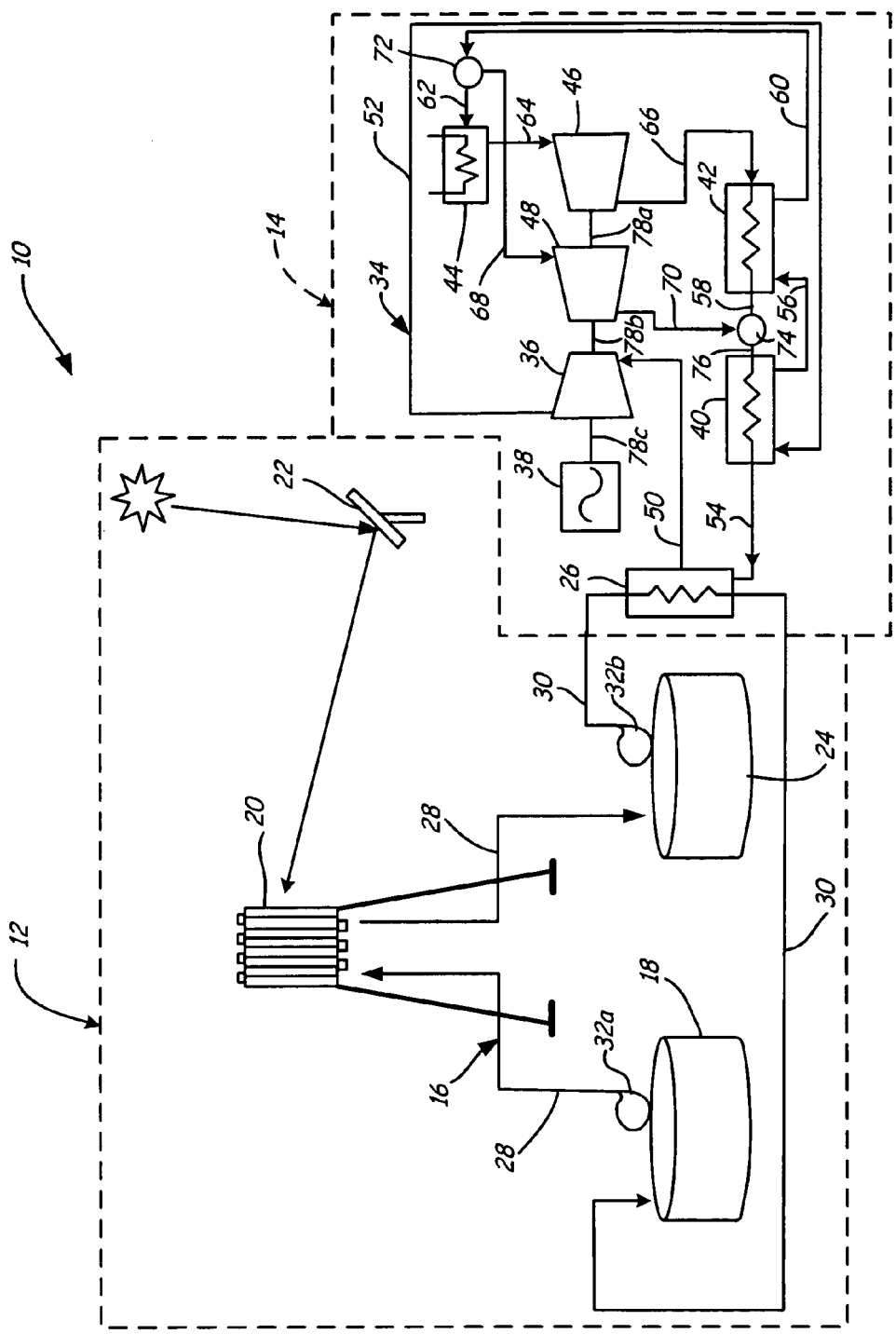
FIG. 1 is a schematic of a turbine system.

FIG. 1 shows a schematic of turbine system 10, which generally includes solar heating system 12 and supercritical carbon dioxide turbine system 14. Solar heating system 12 is used to provide thermal energy to supercritical carbon dioxide turbine system 14 up to 24 hours a day. The use of solar heating system 12 in conjunction with supercritical carbon dioxide turbine system 14 allows for efficient use of supercritical carbon dioxide turbine system 14 and increases the electric conversion efficiency of supercritical carbon dioxide turbine system 14 to approximately 46%. This increases the overall efficiency of turbine system 10, reducing plant capital costs and electricity production costs.

Solar heating system 12 generally includes circulation system 16, cold storage tank 18, solar receiver 20, heliostats 22, hot storage tank 24, and heat exchanger 26. Circulation system 16 transports a heat transfer fluid through solar heating system 12 and generally includes primary line 28, secondary line 30, cold pump 32a, and hot pump 32b. Primary line 28 carries the heat transfer fluid from cold storage tank 18 to solar receiver 20. Secondary line 30 carries the heat transfer fluid from hot storage tank 24 to heat exchanger 26 and back to cold storage tank 18 in a closed loop. The heat transfer fluid is pumped through primary line 28 by cold pump 32a and through secondary line 30 by hot pump 32b.

In operation, the heat transfer fluid is stored in cold storage tank 18. The heat transfer fluid is pumped through cold pump 32a to solar receiver 20. Heliostats 22 redirect and concentrate solar radiation from the sun onto solar receiver 20, which converts the redirected sunlight to thermal energy. The heat transfer fluid flows through solar receiver 20 where it is heated by the concentrated solar energy. Solar receiver 20 is capable of withstanding temperatures of at least approximately 1065 degrees Fahrenheit (° F.). In one embodiment, solar heating system 12 is a solar power tower system.

After the heat transfer fluid has been heated in solar receiver 20 to the desired temperature, the heat transfer fluid flows into hot thermal storage tank 24. The heat transfer fluid is then stored in hot thermal storage tank 24 until it is needed by supercritical carbon dioxide system 14 to produce electricity. Hot thermal storage tank 24 allows for power production during cloudiness or darkness.

When electricity generation is needed, the heated heat transfer fluid is pumped from hot thermal storage tank 24 and circulated through heat exchanger 26 to provide thermal energy to supercritical carbon dioxide system 14. After the heat transfer fluid has passed through heat exchanger 26, the extracted thermal energy from the heat transfer fluid results in a drastic drop in the temperature of the heat transfer fluid to approximately 800° F. The heat transfer fluid is then sent back to cold storage tank 18, where it is stored in closed cycle solar heating system 12 for reuse.

The heat transfer fluid can be any fluid that has the capability to transfer heat and thermally maintain the heat in the fluid, such as water, liquid metal, or molten salt. The heat transfer fluid may also interact with a solid heat transfer media contained in cold and hot storage tanks 18 and 24. In an exemplary embodiment, molten salt is used as the heat transfer fluid through solar heating system 12. The molten salt used to transfer heat from solar receiver 20 to supercritical carbon dioxide system 14 is capable of being heated to a temperature of at least approximately 1065° F. The molten salt can be salts composed of a eutectic mixture of sodium nitrate and potassium nitrate. A suitable composition of the molten salt is between approximately 50% and approximately 70% sodium nitrate by weight and approximately 30% and approximately 50% potassium nitrate by weight. A more suitable composition of the molten salt is approximately 60% sodium nitrate by weight and approximately 40% potassium nitrate by weight.

Supercritical carbon dioxide turbine system 14 generally includes circulation system 34, heat exchanger 26, turbine 36, turbine generator 38, high temperature recuperator 40, low temperature recuperator 42, precooler 44, main compressor 46, and recompression compressor 48. Circulation system 34 transports a Brayton cycle working fluid through supercritical carbon dioxide system 14 and generally includes high temperature line 50, first intermediate temperature line 52, high temperature recuperator outlet line 54, second intermediate temperature line 56, low temperature recuperator outlet line 58, third intermediate temperature line 60, precooler line 62, main compressor line 64, low temperature recuperator inlet line 66, recompression compressor inlet line 68, recompression compressor outlet line 70, first valve 72, second valve 74, and high temperature recuperator inlet line 76. The Brayton cycle working fluid is circulated through circulation system 34 by main compressor 46 and recompression compressor 48. In addition, generator 38, turbine 36, recompression compressor 48, and main compressor 46 are connected on shaft 78. Main compressor 46 and recompression compressor 48 are connected to each other through first shaft section 78a. Recompression compressor 48 and turbine 36 are connected to each other through second shaft section 78b. Turbine 36 and generator 38 are connected to each other by third shaft section 78c. In an exemplary embodiment, supercritical carbon dioxide system 14 is a supercritical carbon dioxide Brayton power conversion cycle.

As the heat transfer fluid from solar heating system 12 passes through heat exchanger 26, the heat is transferred to the Brayton cycle working fluid flowing through supercritical carbon dioxide system 14. In an exemplary embodiment, supercritical carbon dioxide is used as the Brayton cycle working fluid flowing through supercritical carbon dioxide system 14. The supercritical carbon dioxide flowing through supercritical carbon dioxide system 14 has the capability of being heated to a temperature of approximately 1022° F. As the thermal energy is exchanged from the molten salt of solar heating system 12 to the supercritical carbon dioxide of supercritical carbon dioxide system 14 in heat exchanger 26, the supercritical carbon dioxide is heated to a temperature of approximately 1022° F. and a pressure of approximately 2876 pounds per square inch (psi) as it leaves heat exchanger 26 and flows through high temperature line 50. High temperature line 50 transports the supercritical carbon dioxide from heat exchanger 26 to turbine 36.

At turbine 36, the Brayton cycle working fluid is allowed to expand and release energy, reducing the temperature of the Brayton cycle working fluid to approximately 825° F. and approximately 1146 psi. The energy released during the expansion process in turbine 36 is sufficient to turn main compressor 46, recompression compressor 48, and generator 38 on shaft 78. Generator 38 uses the mechanical energy from turbine 36 to turn a generator which generates electricity. In an exemplary embodiment, generator 38 generates approximately 300 MegaWatts of electrical energy net, with an efficiency of approximately 90%. The power generated by generator 38 may be used in various applications, including, but not limited to: powering commercial and residential buildings.

The Brayton cycle working fluid is then transported from turbine 36 to high temperature recuperator 40 through first intermediate temperature line 52. In high temperature recuperator 40, the temperature of the Brayton cycle working fluid drops to approximately 335° F. The Brayton cycle working fluid is then passed through second intermediate temperature line 56 to low temperature recuperator 42, where the temperature of the Brayton cycle working fluid is further reduced to approximately 158° F. High temperature and low temperature recuperators 40 and 42 function as heat exchangers that recapture heat and send the heat back into supercritical carbon dioxide system 14 to improve the efficiency of supercritical carbon dioxide system 14. Thus, heat is added to the Brayton cycle working fluid in high and low temperature recuperators 40 and 42, as well as in heat exchanger 26.

From low temperature recuperator 42, the Brayton cycle working fluid is sent through third intermediate temperature line 60 to first valve 72. At first valve 72, a portion of the Brayton cycle working fluid is passed through precooler line 62 to precooler 44 where the temperature of the Brayton cycle working fluid is reduced to approximately 90° F. before the Brayton cycle working fluid is transported through main compressor line 64 to main compressor 46. Precooler 44 may reject the heat into water, which is sent to a cooling tower to release the heat to the atmosphere. Alternatively, the heat rejection may also be accomplished by directly air cooling the heat. The cooling is required to lower the temperature of the Brayton cycle working fluid to the required low starting temperature of closed supercritical carbon dioxide system 14. At main compressor 46, the Brayton cycle working fluid is pressurized to a pressure of approximately 2900 psi and a temperature of approximately 142° F. By operating main compressor 46 with inlet conditions immediately above the carbon dioxide critical point, the work required is significantly reduced. The Brayton cycle working fluid then flows through low temperature recuperator inlet line 66 back to low temperature recuperator 42 and is heated to a temperature of approximately 317° F. The Brayton cycle working fluid then leaves low temperature recuperator 42 and enters second valve 74 through low temperature recuperator outlet line 58.

In parallel, the second portion of the Brayton cycle working fluid is transported from first valve 72 through recompression compressor inlet line 68 to recompression compressor 48 where it is pressurized to approximately 2899 psi at a temperature of approximately 317° F. The Brayton cycle working fluid from recompression compressor 48 subsequently rejoins the main compressor 46 discharge through recompression compressor outlet line 70 into second valve 74. The combined Brayton cycle working fluid then leaves second valve 74 through high temperature recuperator inlet 76 and enters high temperature recuperator 40, where it is heated to approximately 746° F. From high temperature recuperator 40, the Brayton cycle working fluid is passed through high temperature recuperator outlet line 54 and enters heat exchanger 26 at a temperature of approximately 746° F. and a pressure of approximately 2895 psi.

Figure 2:
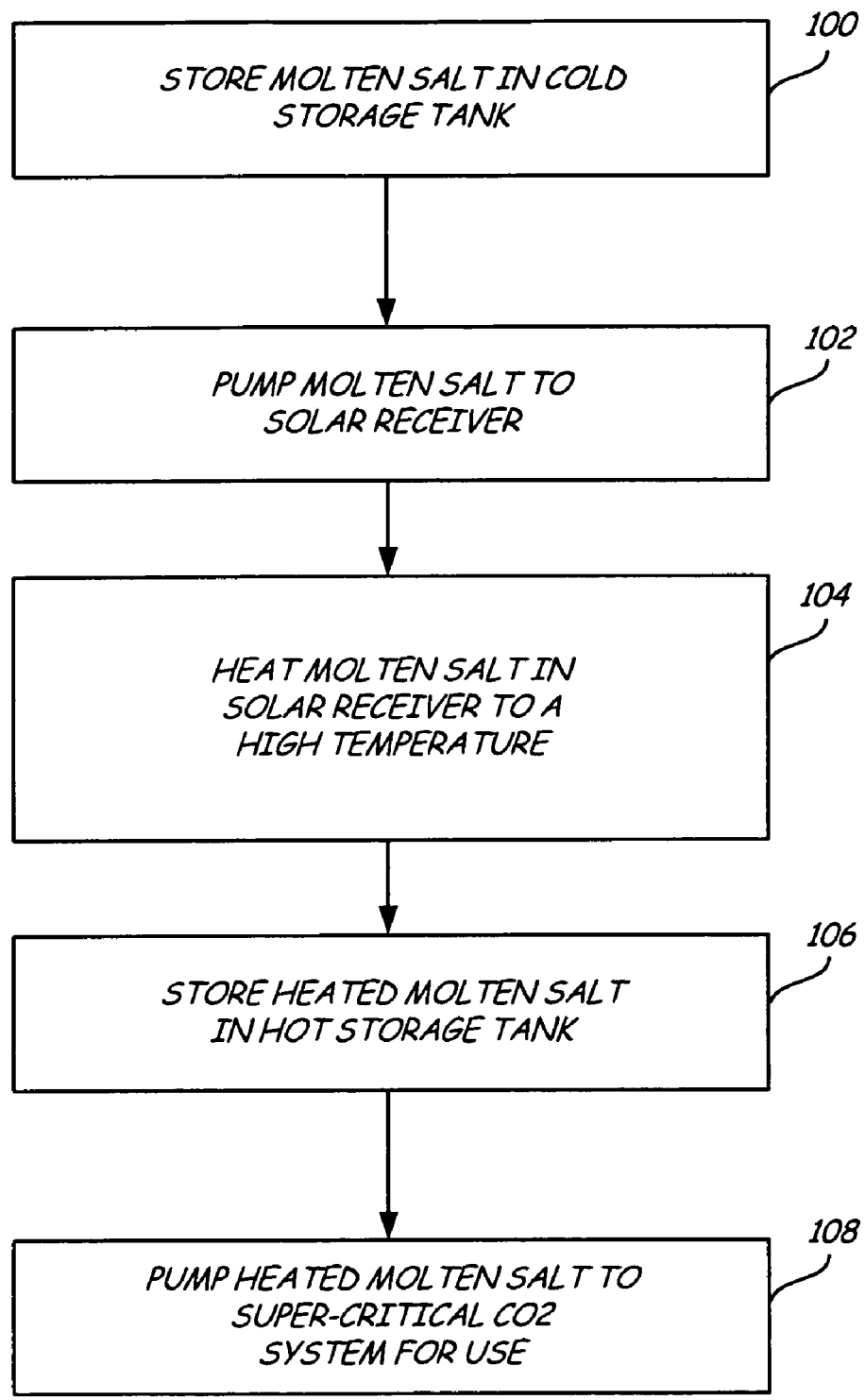
FIG. 2 is a diagram of a method of using molten salt as the heat transfer fluid of a solar heating system.

FIG. 2 shows a diagram of a method of using the heat transfer fluid from solar heating system 12 to provide thermal energy to supercritical carbon dioxide system 14. As previously mentioned, the molten salt is initially stored in cold storage tank 18, Box 100. When needed, the molten salt is pumped to solar receiver 20 (Box 102) and heated to a temperature of at least approximately 1065° F., Box 104. As shown in Box 106, the heated molten salt is then sent to hot storage tank 24 until it is needed by supercritical carbon dioxide system 14. The heated molten salt is pumped to supercritical carbon dioxide system 14, where the thermal energy from the molten salt is transferred to the supercritical carbon dioxide to power supercritical carbon dioxide system 14, Box 108.

The turbine system uses a molten salt solar heating system to provide thermal energy to a supercritical carbon dioxide system. The supercritical carbon dioxide system requires peak carbon dioxide temperatures of approximately 1022° F. The solar heating system passes molten salt as a heat transfer fluid through the solar heating system to transport the thermal energy required to power to supercritical carbon dioxide system. In an exemplary embodiment, the solar heating system is a solar power tower system that heats the molten salt to a temperature of approximately 1065° F.

Although the present invention has been described with reference to preferred embodiments, workers skilled in the art will recognize that changes may be made in form and detail without departing from the spirit and scope of the invention.

The invention claimed is:

1. A turbine system comprising:
   a supercritical carbon dioxide turbine having an outlet;
   a high temperature recuperator having a first inlet connected to the outlet of the supercritical carbon dioxide turbine and a first outlet;
   a low temperature recuperator having a first inlet connected to the first outlet of the high temperature recuperator and a first outlet;
   a first valve having an inlet, a first outlet and a second outlet, wherein the first inlet of the first valve is connected to the first outlet of the low temperature recuperator;
   a compressor connected to the first outlet of the first valve;
   a precooler connected to the second outlet of the first valve; and
   a solar heating system having a molten salt heat transfer fluid for providing thermal energy to the supercritical carbon dioxide turbine.

2. The turbine system of claim 1, wherein the supercritical carbon dioxide turbine operates at a temperature of at least about 1022 degrees Fahrenheit.

3. The turbine system of claim 1, wherein the molten salt heat transfer fluid comprises between about 50% sodium nitrate and about 70% sodium nitrate and between about 30% potassium nitrate and about 50% potassium nitrate by weight.

4. The turbine system of claim 1, wherein the solar heating system heats the molten salt heat transfer fluid to a temperature of at least about 1065 degrees Fahrenheit.

5. The turbine system of claim 1, wherein the supercritical carbon dioxide turbine comprises a supercritical carbon dioxide Brayton power conversion cycle.

6. The turbine system of claim 1, and further comprising a heat exchanger, wherein the thermal energy is transferred from the molten salt heat transfer fluid to a carbon dioxide Brayton cycle working fluid.

7. A system for providing energy for a supercritical carbon dioxide turbine, the system comprising:
   a Brayton cycle working fluid for providing energy to the supercritical carbon dioxide turbine;
   a high temperature recuperator that receives the Brayton working fluid from the supercritical carbon dioxide turbine and cools it;
   a low temperature recuperator that receives the Brayton working fluid from the high temperature recuperator and cools it;
   a precooler;
   a first valve that divides the Brayton cycle working fluid cooled by the low temperature recuperator into a first portion that flows through the precooler and a second portion that does not flow through the precooler;
   a second valve that combines the first portion of the Brayton cycle working fluid that is cooled by the precooler and the second portion of the Brayton cycle working fluid that is not cooled by the precooler; and
   a solar receiver for heating a heat transfer fluid to a temperature of at least about 1065 degrees Fahrenheit, wherein the heat transfer fluid is in communication with the Brayton cycle working fluid.

8. The system of claim 7, wherein the supercritical carbon dioxide turbine operates at an inlet temperature of about 1022 degrees Fahrenheit.

9. The system of claim 7, wherein the heat transfer fluid comprises molten salt.

10. The system of claim 9, wherein the molten salt heat transfer fluid comprises between about 50% sodium nitrate and about 70% sodium nitrate and between about 30% potassium nitrate and about 50% potassium nitrate by weight.

11. The system of claim 9, wherein the heat transfer fluid provides thermal energy to the supercritical carbon dioxide turbine.

12. The system of claim 11, and further comprising a heat exchanger, wherein the thermal energy is transferred from the molten salt to carbon dioxide.

13. The system of claim 7, wherein the system is a solar heating system.

14. A method of generating electricity with a supercritical carbon dioxide turbine, the method comprising:
   capturing solar energy from sunlight;
   heating a heat transfer fluid to a temperature of at least about 1065 degrees Fahrenheit with the solar energy;
   transporting energy from the heat transfer fluid to heat a Brayton cycle working fluid of the supercritical carbon dioxide turbine;
   passing the heated Brayton cycle working fluid through the supercritical carbon dioxide turbine;
   cooling the Brayton cycle working fluid from the supercritical carbon dioxide turbine with a high temperature recuperator;
   cooling the Brayton cycle working fluid from the high temperature recuperator with a low temperature recuperator;
   dividing the cooled Brayton cycle working fluid from the low temperature recuperator into a first portion and a second portion;
   cooling the first portion of the Brayton cycle working fluid;
   not cooling the second portion of the Brayton cycle working fluid; and
   combining the first portion of the Brayton cycle working fluid and the second portion of the Brayton cycle working fluid that is not cooled after the step of cooling the first portion of the Brayton cycle working fluid.

15. The method of claim 14, wherein capturing solar energy comprises using a solar heating system.

16. The method of claim 14, wherein the heat transfer fluid comprises molten salt.

17. The method of claim 16, wherein the molten salt heat transfer fluid comprises between about 50% sodium nitrate and about 70% sodium nitrate and between about 30% potassium nitrate and about 50% potassium nitrate by weight.

18. The method of claim 14, wherein transporting the energy of the heat transfer fluid to heat the Brayton cycle working fluid of the supercritical carbon dioxide turbine comprises using a heat exchanger.

19. The method of claim 14, wherein the heat transfer fluid provides thermal energy to the supercritical carbon dioxide turbine.

20. The method of claim 14, wherein the supercritical carbon dioxide turbine comprises a supercritical carbon dioxide Brayton power conversion cycle.

* * * * *